Patented Oct. 24, 1950

2,527,316

UNITED STATES PATENT OFFICE 2,527,316

PRODUCTION OF CYANURIC ACID

Johnstone S. Mackay, Old Greenwich, Conn., assignor to American Cyanamid Company, New York, N. Y., a corporation of Maine No Drawing. Application June 14, 1949,
Serial No. 99,131

3 Claims. (Cl. 260—248)

This invention relates to the preparation of cyanuric acid.

The commercial method for the preparation of cyanuric acid involves the condensation of urea with zinc chloride. This process has been described in the Journal of the Society of Chemical Industries, vol. 67, p. 66 (1948). The only other known methods of preparing cyanuric acid are not competitive, as they involve the hydrolysis of expensive triazines such as ammelide, cyanuric chloride, and the like.

In condensing urea with zinc chloride, the yield is only about 60%. The surprising discovery has now been made that if an ammonium halide is substituted for zinc chloride in the urea fusion, the yield may be raised to 85%.

It is an object of this invention, therefore, to provide a cheap and practical process of preparing cyanuric acid from inexpensive and readily available reactants. It is a further object of the invention to prepare cyanuric acid by fusing urea in the presence of an ammonium halide.

Additional objects will be evident from the following description of the invention.

The general method of preparation is simply to fuse urea and an ammonium halide at a temperature of at least 220° C. Temperatures up to the decomposition point of the ammonium halide may be used; however, temperatures higher than 250° C. are unnecessary, since the conversion will generally be completed by the time this temperature is reached. A small amount of cyanuric acid is formed immediately upon the completion of the fusion and good yields may be obtained in as short a time as 15 minutes. Heating beyond one hour is generally superfluous. After the reaction is complete, cyanuric acid is leached from the reaction mass with boiling water, and it crystallizes from the filtrate on cooling.

The preferred ammonium halide is ammonium chloride, but the iodide, bromide, and fluoride may also be used with good results. The ratio of reactants is not critical and may vary widely. However, Example 2 below embodies the preferred conditions for making cyanuric acid according to the method of this invention.

The following examples illustrate without limiting the invention.

Example 1

60 g. of ammonium chloride and 60 g. of urea were fused in an open beaker at 225° C. and heated for one hour. The resulting reaction mass was dissolved in boiling water to provide 1700 cc. of solution, and the solution was allowed to cool. 31.6 g. of cyanuric acid crystals deposited on cooling. Remaining in the mother liquor was about 4.4 g. of product, accounting for a yield of 81.5% of theory.

It is a preferred embodiment of the invention to recover the mixed ammonium halide and cyanuric acid from the mother liquor, and to recycle same, as in the following example.

Example 2

240 g. of ammonium chloride and 480 g. of urea were heated in a beaker for 15 minutes at 250° C. The product in the beaker at the end of this period weighed 563 g. It was poured into a liter of water at room temperature and the solution was filtered and washed with 300 cc. of water, giving 289 g. of crude cyanuric acid, a yield of 84%. The wash water and mother liquor were combined and evaporated to dryness to yield 274 g. of combined ammonium chloride and cyanuric acid. This mixture was heated with 480 g. of urea at 250° C. for 15 minutes to provide 562 g. of product. Said product was poured into a liter of water, the solution was filtered, and the resulting solid crude cyanuric acid was washed with 300 cc. of water and dried. It weighed 334 g.

By varying the proportions of reactants, time, and reaction temperature, using the procedure of Example 1, the results summarized in Table I were obtained.

TABLE I

Preparation of cyanuric acid by heating urea and ammonium chloride

| Run No. | Charge, Mols | | Temp., °C. | Time, hrs. | Yield, Per Cent of Theory |
|---|---|---|---|---|---|
| | Urea | NH$_4$Cl | | | |
| 1586 | 1 | 0 | 225 | 1 | 46 |
| 1578 | 1 | 0.56 | 220 | 1 | 68 |
| 1573 | 1 | 1.12 | 250 | 1 | 73 |
| 1585 | 1 | 0.28 | 225 | 1 | 76 |
| 1576 | 1 | 1.12 | 250 | .25 | 80 |
| 1528 | 1 | 1.12 | 225 | 1 | 82 |
| 1588 | 1 | 0.56 | 250 | .25 | 85 |

While the invention has been described with particular reference to specific embodiments, it is to be understood that it is not to be limited thereto but is to be construed broadly and restricted solely by the scope of the appended claims.

I claim:

1. The method of making cyanuric acid comprising heating urea and an ammonium halide at a temperature of at least 220° C. at substantially atmospheric pressure and separating the thus-formed cyanuric acid from the reaction mass.

2. The method according to claim 1 in which the ammonium halide is ammonium chloride.

3. The method of making cyanuric acid comprising heating about 2 mols of urea with 1 mol of ammonium chloride at about 250° C. at substantially atmospheric pressure for about 15 minutes and recovering the thus-formed cyanuric acid.

JOHNSTONE S. MACKAY.

REFERENCES CITED

The following references are of record in the file of this patent:

FOREIGN PATENTS

| Number | Country | Date |
|---|---|---|
| 598,175 | Great Britain | Feb. 12, 1948 |